(12) United States Patent
Zawadowskiy et al.

(10) Patent No.: US 12,542,815 B2
(45) Date of Patent: Feb. 3, 2026

(54) BEHAVIORAL GRAPH FIREWALL POLICY

(71) Applicant: Cisco Technology, Inc., San Jose, CA (US)

(72) Inventors: Andrew Zawadowskiy, Hollis, NH (US); Oleg Bessonov, Littleton, MA (US)

(73) Assignee: Cisco Technology, Inc., San Jose, CA (US)

( * ) Notice: Subject to any disclaimer, the term of this patent is extended or adjusted under 35 U.S.C. 154(b) by 79 days.

(21) Appl. No.: 18/584,172

(22) Filed: Feb. 22, 2024

(65) Prior Publication Data
US 2025/0274488 A1 Aug. 28, 2025

(51) Int. Cl.
*H04L 9/40* (2022.01)

(52) U.S. Cl.
CPC .......... *H04L 63/20* (2013.01); *H04L 63/0263* (2013.01); *H04L 63/1425* (2013.01)

(58) Field of Classification Search
CPC .. H04L 63/20; H04L 63/0263; H04L 63/1425
See application file for complete search history.

(56) References Cited

U.S. PATENT DOCUMENTS

| | | | | |
|---|---|---|---|---|
| 2007/0143827 | A1* | 6/2007 | Nicodemus | H04L 63/102 726/2 |
| 2014/0282855 | A1 | 9/2014 | Clark | |
| 2017/0180316 | A1* | 6/2017 | Teng | H04L 63/105 |
| 2020/0045018 | A1* | 2/2020 | Bargury | H04L 41/0813 |
| 2020/0382470 | A1* | 12/2020 | Butler | G06F 21/554 |
| 2021/0014243 | A1* | 1/2021 | Kulaga | H04L 63/1416 |
| 2021/0185084 | A1* | 6/2021 | Sodja | H04L 63/1458 |
| 2021/0194907 | A1* | 6/2021 | Bertiger | H04L 43/0811 |
| 2023/0020094 | A1 | 1/2023 | Fainberg | |
| 2023/0104129 | A1 | 4/2023 | Miriyala | |
| 2023/0171229 | A1* | 6/2023 | Arora | H04L 63/029 726/11 |

FOREIGN PATENT DOCUMENTS

| | | |
|---|---|---|
| CN | 105681327 B | 5/2019 |
| CN | 115941294 A | 4/2023 |

* cited by examiner

*Primary Examiner* — Javier O Guzman
(74) *Attorney, Agent, or Firm* — Lee & Hayes, P.C.

(57) ABSTRACT

Techniques and systems described herein relate to a security system for a network or other monitored system of computing devices, such as a firewall system. The techniques and systems provide for generation of behavioral graphs based on observed network and/or system traffic during an observation period and subsequent creation of a network security policy using the behavioral graph as the framework for the network security policy. The techniques and systems additionally provide for manipulation, evaluation, and querying of network security policies through the use of matrix operations on behavioral graphs and plain text inputs and querying of the behavioral graph to form a network security policy.

18 Claims, 8 Drawing Sheets

BEHAVIORAL GRAPH FIREWALL POLICY

TECHNICAL FIELD

The present disclosure relates generally to security policies for networks and entities, and more specifically, to the use of observed behavioral graphs to determine, manipulate, and query behavior within the computer networks.

BACKGROUND

As technology advances, the number and variety of devices that are connected to communications networks are rapidly increasing. Each device may have its own respective vulnerabilities which may leave the network open to compromise or other risks. Preventing the spreading of an infection of a device or an attack through a network can be important for securing a communication network.

Computer systems contain vast amounts of data and enable a wide spectrum of functionality. Enterprises often control computer systems that are accessible to the public Internet, which brings potential security risks. Internal computer systems (e.g., behind a firewall or otherwise at least partly inaccessible via a network connection) also pose various security risks. Such risks (both external and internal) can result in unauthorized use of computing resources, unauthorized actions being taken, unauthorized access to particular data, and/or unauthorized physical access.

Malware is generally defined as software that is specifically designed to disrupt, damage, or gain unauthorized access to or control of a computer system, or to steal or corrupt data or generally do other nefarious things to the computer system or its files or data. Examples of malware may be in the form of a virus, trojan, worm, adware, spyware, rootkit, or ransomware. A software vulnerability is any weakness in software or in an operating system (OS) that may be exploited to disrupt, damage, or gain unauthorized access to or control of the software or computer system, or compromise or cause unintended behavior of the software or computer system. Vulnerabilities are often exploited by attackers to inject malware or otherwise gain control of or disrupt a computer system.

Ransomware is notorious because it is designed to block access to a computer system, or its files or data, or reveal confidential data, unless a sum of money is paid by the victim to the attacker. Ransomware often encrypts a computer system's files, and the attacker demands a ransom payment to restore access to the data which may occur by the victim obtaining the mathematical decryption key known only to the attacker. Ransomware may cripple a business by denying it access to its system or data, thus forcing it to pay a potentially costly sum.

Procedures commonly recommended to help in preventing a malware attack include maintaining updated operating systems and software applications, backing up files and data, avoiding installing untrusted applications, avoiding selecting on untrusted web links, and using appropriate antivirus, whitelisting, and other malware detection software. However, even by taking these standard precautions, malicious attackers change malware so quickly that it is nearly impossible to recognize and prevent attacks from new versions or slight variations of the malware, or completely new malware, until it is too late.

Such security risks can compromise operational integrity. Existing detection systems may attempt to avoid certain security risks, but frequently suffer from an inability to correlate information across multiple different domains, and thus may fail to detect and/or mitigate certain attacks or risks.

When a firewall and/or security policy becomes old, it may be difficult or impossible to alter, add, or remove portions of the security policy without creating vulnerabilities or unintentionally leaving gaps in the firewall or security policy.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
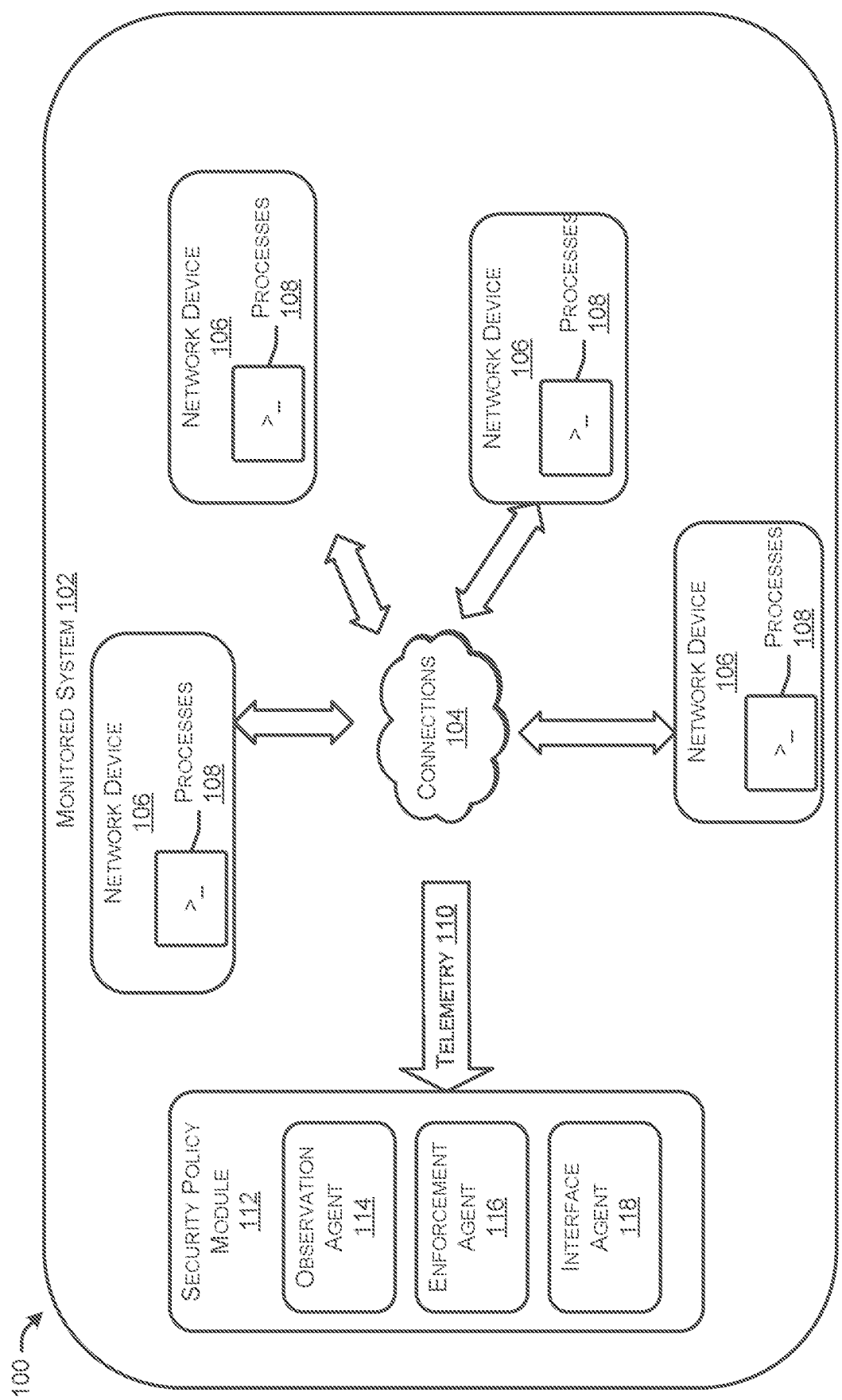
FIG. 1 illustrates an example system architecture for behavioral monitoring using an observed behavioral graph, according to at least one example.

The present disclosure relates generally to detection and protection against computer system attacks. In some examples, the systems and techniques described herein may provide techniques and systems for network security policies including policy generation, updating, revisions, and querying. Modern firewall policy may become increasingly complex, especially as policies are added and/or removed from the policy. The firewall policy (referred to herein as a network security policy), may have interconnected policies and unintended consequences of changes, additions, or removals of particular policies. The systems and techniques described herein provide for converting of firewall policy into a behavioral graph that allows manipulations of behaviors and firewall policy as a behavioral graph providing functionality such as an ability to query practical questions about the firewall policy. The behavior graph may be generated based on an existing policy and/or may be generated by observation of network application executions during an observation period.

In an illustrative example, one general aspect includes a method for monitoring a network system of computing device. The method includes determining an observation phase for observing the network system. The method also includes determining observed telemetry, during the observation phase, representing network communications. The method further includes generating a behavioral graph of network communications between applications based on the observed telemetry. The method also includes determining a network security policy by determining one or more rules for computing devices of the network system based at least in part on the behavioral graph and determining an enforcement phase based at least in part on the network security policy. The method further includes monitoring network application traffic to prevent or allow executions based at least in part on the network security policy.

Implementations may include one or more of the following features. In some examples, the network security policy may include one or more user generated rules, one or more previous policies, and policies based on the observed telemetry from the behavioral graph. In some examples, generating the behavioral graph is based on observed network communications during the observation phase, where the observed telemetry during the observation phase are considered valid. The method may also include determining to remove a workload from the network system, determining a behavioral graph for the workload, removing the behavioral graph for the workload from the behavioral graph for the network system to generate a second behavioral graph for the network system, and determining a second network security policy based at least in part on the second behavioral graph for the network system. Determining the graph for the workload may be based at least in part on the observed telemetry or a portion of the behavioral graph. The method may include receiving a query associated with connectivity to a computing device of the network system, determining a response based at least in part on the behavioral graph, and providing, at a user interface, the response. Determining the response may include converting the query of connectivity to the computing device to a format compatible with the behavioral graph to produce a graph query, querying the behavioral graph using the graph query to determine a graph response, and converting the graph response to the response in a format for output at the user interface. Implementations of the described techniques may include hardware, a method or process, or computer software on a computer-accessible medium.

EXAMPLE EMBODIMENTS

The present disclosure relates generally to using observed network traffic to perform security monitoring of network traffic as well as to enable security policy modifications, additions, and removals in a simplified manner without unintended consequences. The behavioral graph is generated by observing network communications over an observation period of time by collecting telemetry of flows needed for applications running within the network and/or device and subsequently entering an enforcement mode wherein the observed behavioral graph is used to convert the graph to policy for enforcement and implementation within the network.

The present disclosure relates generally to detection and protection against computer system attacks. In some examples, the systems and techniques described herein may provide techniques and systems for network security policies including policy generation, updating, revisions, and querying. Modern firewall policy may become increasingly complex, especially as policies are added and/or removed from the policy. The firewall policy (referred to herein as a network security policy), may have interconnected policies and unintended consequences of changes, additions, or removals of particular policies. The systems and techniques described herein provide for converting of firewall policy into a behavioral graph that allows manipulations of behaviors and firewall policy as a behavioral graph providing functionality such as an ability to query practical questions about the firewall policy. The behavior graph may be generated based on an existing policy and/or may be generated by observation of network application executions during an observation period.

Aspects and implementations of the present disclosure are directed to access management including access management of a network. The systems and methods described herein may be employed with respect to network security, among other fields. More particularly, it can be appreciated that devices with vulnerabilities are a significant and growing problem. At the same time, the proliferation of network-connected devices (e.g., internet of things (IoT) devices such as televisions, security cameras (IP cameras), wearable devices, medical devices, etc.) can make it difficult to effectively ensure that network security is maintained. Accordingly, described herein in various implementations are systems, methods, techniques, and related technologies, which allows customized access configurations including determination of access rules for each entity and applying or assigning access rules at an enforcement point (e.g., network device, for instance, a network switch) closest to the entity.

Typically, data communication and data processing needs of a large enterprise warrant an equally humungous, efficient network infrastructure. A network infrastructure catering to the data processing and data communication requirements of large enterprises incorporate numerous computer systems as well as a multitude of workgroups selectively interconnected using varying network topologies and rendered accessible via mutually different network interface units. Many large enterprises and corresponding enterprise networks which, as discussed above, constitute an interconnection between a multitude of computer-based devices and computer-accessible resources (for example, enterprise servers, enterprise applications, enterprise databases, internal network interfaces, external network interfaces, printers and the like—also referred to as 'enterprise network assets') spread across multiple departments of an enterprise.

Enterprise networks often form the backbone of the enterprises' communication network, and support interconnection between a multitude of computer-based devices (typically storing or having access to sensitive enterprise data and referred to herein as "network devices") and computer-accessible resources (printers, fax machines, data stores, and the like) dispersed across various geographically distant locations. Enterprise networks are suited to eliminate isolated users and isolated workgroups and to facilitate seamless data communication between geographically dispersed computer-based devices and computer-accessible resources.

In addition to the advantages specified above, enterprise networks also bring about an improvement in internal as well as external enterprise data management. Further, an enterprise network is preferred over a conventional service provider network since it facilitates virtual integration of (a multitude of) user computers (computer-based devices), workgroups, and eliminates isolated users and workgroups. Another advantage of enterprise networks vis-a-vis the conventional service provider networks is that they enable each of the user computers and workgroups to communicate seamlessly, all the while exhibiting adherence to predefined (industry recognized) performance, reliability and security standards.

Enterprise networks are often interlinked with and consequentially provide access to in-house database systems storing sensitive organizational information, multitude of computer-based devices generating and accessing sensitive organization information, multitude of online services hosted across the enterprise computing environment, and every online activity occurring across the enterprise computing environment. Given that all the sensitive information and all the online activities of the organization (including hosting and implementation of consumer services, consumer and partner interactions, data communications, billing and related financial activities, payroll processing, and the like) are hosted on the enterprise network, it is imperative that the enterprise network is safeguarded against intrusions from external sources, for example, computer-based devices external to the enterprise network, possibly accessible to users with a malicious intent, for example, network hackers.

Network security policy is implemented to ensure secure access to the systems, devices, and data of a particular network. The network security policy may be rule-based and may be managed by a security operations team. Over time, additional threats, security flaws, or changes are made to the network security policy. As the network security policy gets older, and has increasing numbers of changes, patches, revisions, and alterations, it can become increasingly complex and difficult to safely modify or remove policies without leaving vulnerabilities. Additionally, it can be difficult to add to the existing policy without having additional unintended consequences, such as blocking previously allowed and safe executions unintentionally. Network security policies may be overly broad or overly narrow, either of which can cause problems for the network. With an overly strict policy, the devices, applications, and systems connected to the network may be affected and may not be able to perform their intended functions. With an overly permissive policy, the network may not be adequately secured against threats.

When a security policy becomes old or repeatedly altered, it may become difficult or even impossible for a security team to accurately identify which portions of the policy protect particular elements and against certain threats. Further, changes to a tangled web of network security policy may be difficult to safely implement without leaving loopholes or unintentionally blocking network traffic that is needed for the system connected over the network. The systems and methods described herein provide for understanding of complex network security policy, manipulation of the security policy as a matrix operation, and provides for querying the network security policy which may be accomplished easily once the network security policy is converted into the behavioral graph to identify changes, redundancies, loopholes, as well as to explain purposes or reasons behind particular policies. As such network security policies may be increasingly complex, the systems and methods herein provide for methods to present information about the security policy and explain portions of a security policy in response to user queries.

The systems and methods herein provide for mapping and converting of network security policies into a behavioral graph that can manipulated, mapped, queried, and understood to simplify network security policy as well as ensure coverage and protection for a network.

A behavioral graph is a representation, using graph notation, of behavior, e.g., communications that may occur across a network (e.g., between network devices) during execution of an application/workload. In such behavioral graph, each node in the graph corresponds to a an object such as a network device. Behavioral graphs may also include not only network connections, connections between different components of the workload but also other activities of the processes which represent full workload. These activities may include created files, read file, written files, loaded modules, loaded libraries, created named objects like shared memory and others less often used objects which are used by attackers to bypass detections while performing intended malware functions. The behavioral graphs may be created using telemetry from different interceptions like EBPF, kernel drivers, auditd and others, which can see all of the process activities (system calls and more) and report on it in one format or another (JSON, Windows events etc.). Accordingly, such behavioral graphs may be the result of learning and/or observing real-time execution of application/workloads being protected when all the activity gets converted into a behavioral graph.

Figure 2:
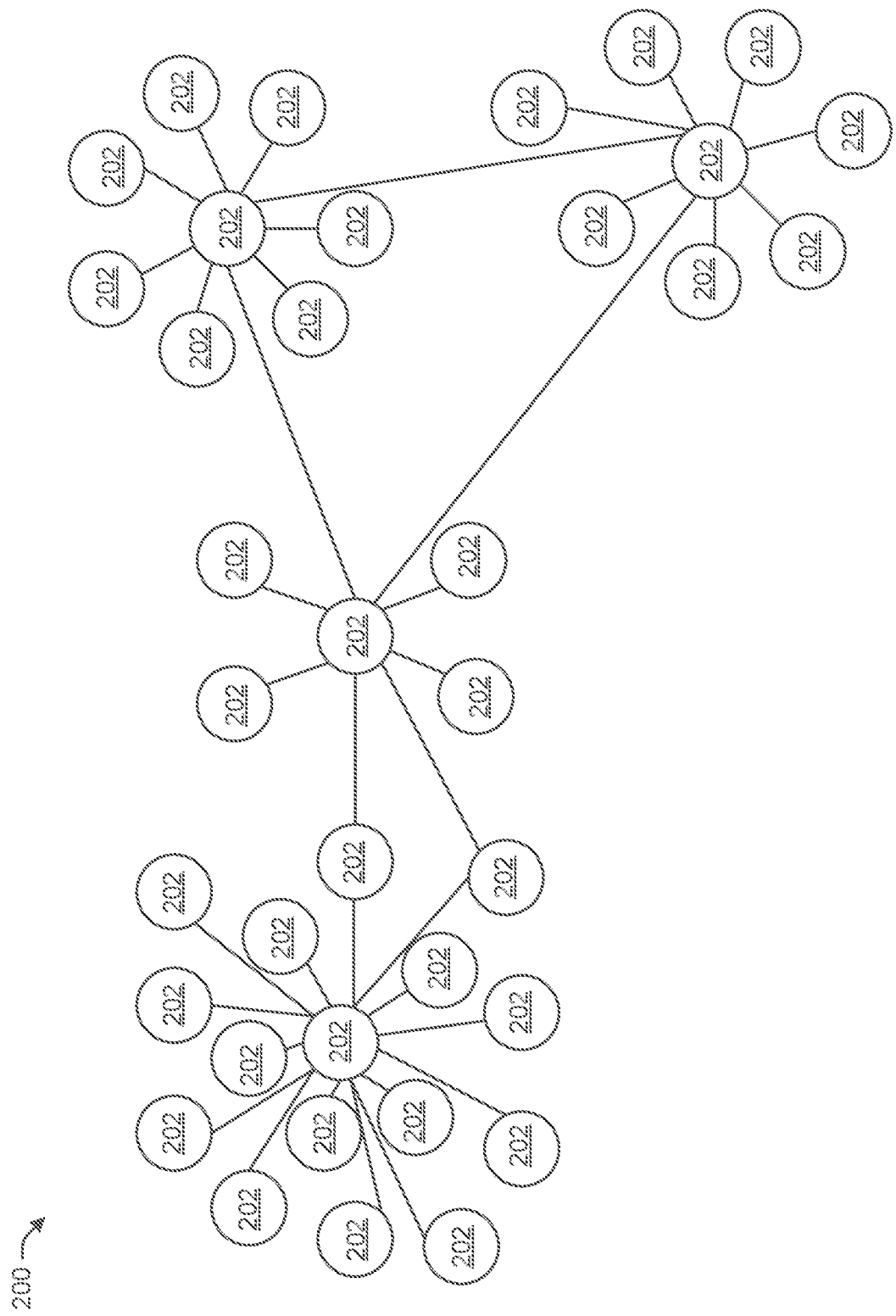
FIG. 2 illustrates an example of a behavioral graph used for monitoring application executions, according to at least one example.

The behavioral graphs described herein may model network communications between components of workloads and between one or more workloads and/or network devices. On such a network the behavioral graph may include network connections between different components, such as depicted in FIG. 2. The behavioral graphs may be used to generate firewall security policy to allow all the observed connection made by application while denying all other connections.

The behavioral graph may be created and supplemented by processing for a plurality (e.g., all if possible) workloads on the network. As the behavioral graph is created for the various workloads across the network, the behavioral graph may become a representation of the communications required for the network devices of the network to perform the actions required by the various applications. Accordingly, after the behavioral graph is created during the observation period, the security policy may be created to restrict communications to only those included in the behavioral graph, thereby preventing malicious actions or threats from infiltrating the network.

The systems and methods described herein provide for conversion of network behavioral graphs to firewall policy. When done without any optimization, such transformation will create a new ALLOW rule for every triplet in the behavioral graph (e.g., (FROM_NODE)-[EDGE]-(TO_NODE)). For example, triplet such as (PROCESS_A)-[CONNECTED_ON_PORT_3306]-(MySQL) would create a new ALLOW rule for PROCESS_A running on particular host/container trying to connect on specific port 3306 to host/container where target MySQL server runs. Given this forward transformation, the behavioral graph to firewall policy, the system may also define how to perform reverse operation, given firewall policy convert it into a network behavioral graph which represents the current firewall policy. This allows the system to perform different queries and manipulations of firewall policy, which are not easy and/or possible without graph form.

The network behavioral graphs may include both behavioral graphs from observations and graphs from policy which may be equivalent. As a normal graph can be expressed as an adjacency list and adjacency matrix. In case of adjacency matrices expressed as sparse matrices for space efficiency while preserving all the advantages of matrix operation as applied to the behavioral graph.

The system also defines a number of operations on such behavioral graphs (both graphs from observations and graphs from policy) expressed as adjacency matrices/adjacency lists which allows to perform matches, merges, intersection, union, subtractions, and other graphs operations in uniform and high-performance ways. For example, graphs of multiple workloads (workload 1, workload 2, workload 3, workload 4) can be combined in one large graph, and policy generated for such graph as demonstrated below.

$$BG_{1234} = BG_1 + BG_2 + BG_3 + BG_4;$$

$$P_{1234} = GeneratePolicy(BG_{1234})$$

When later additional workloads (workload 1 and workload 2) are removed from the original graph it is possible to subtract just the removed workloads behavioral graphs, as illustrated below.

$$BG_{1234} = GraphGenerate(P_{1234});$$

$$P_{34} = PolicyGenerate(BG_{1234} - (BG_1 + BG_2))$$

When a workload or a portion of the workload is removed, the adjacency matrix representing that workload can be subtracted from the overall behavioral graph. In other operations, the behavioral graphs can be adjusted and various operations performed to add additional workloads, remove all or a portion of a workload, or otherwise alter the final behavioral graph.

The systems and methods herein may also provide for such actions when the firewall policy is a combination of automatically generated policy rules, old policy rules for which there is no corresponding behavioral graph, and rules created by the human given some other knowledge. When workload 1 and workload 2 are removed, the system may generate new policy by adding workload 3 and workload 4 but have to first convert the current firewall policy to graph and only then extract $BG_1+BG_2$. The operations are represented below.

$$P_{gen} =$$

$GeneratePolicy(BG_1 + BG_2 + BG_3 + BG_4)$ – policy generated from $BGs$;

$P_{old}$ – existing policy for old workloads without corresponding $BGs$;

$P_{user}$ – user created policy rules;

$$P_{total} = P_{gen} + P_{old} + P_{user}$$

To subtract $BG_1$ and $BG_2$ which correspond to workload 1 and workload 2, the system would perform following steps.

$$BG_{total} = GraphGenerate(P_{total})$$

$$P_{new} = PolicyGenerate(BG_{total} - (BG_1 + BG_2))$$

The illustrative example provided herein works not only when there is full control of firewall policy but also when there is only partially control of the firewall policy, by expressing policy in a behavioral graph it is able to remove behavioral graphs for removed workloads while keeping all other policy elements in the final policy.

The system also enables performing different queries over existing policy expressed as a graph. For example, user can ask constraint types of query such as "Is there NO direct path from internet to certain Kubernetes Pod in current firewall policy?"; "Is there any direct or indirect path to financial server storing earnings reports and other highly confidential financial information?"; or "Does any server that has a certain CVE have any direct or indirect way to connect to internet?". These queries may be expressed in one of graph query languages, such as Gremlin or openCypher.

The systems and methods described herein provide for creation of a network security policy, manipulation of an existing security policy, simplification of an existing security policy, and querying of a network security policy. The systems and methods herein enable a network security policy to be created that may allow only flows needed for applications to run within the network. In some examples, the systems and methods herein may be used to create a network security policy. The network security policy may be generated by creating a behavioral graph (e.g., a network behavioral graph) by observing network communications over an observation period. In an example, the network devices may be observed during the observation period to create a behavioral graph of how the network devices and associated applications behave and interact across the network. Using the behavioral graph, a network security policy may be created by converting the behavioral graph to network security policy. Given the conversion from behavioral graph to security policy, the systems and methods herein may also provide for firewall policy conversion to a behavioral graph.

In an example, the network security policy may include a microsegmentation approach. Microsegmentation may refer to a security policy approach by dividing a network into segments and applying security controls to each segment based on the requirements of the segment. The microsegmentation security policy may only allow communications across the network that are required for applications run by the network devices, but nothing outside of those communications. The behavioral graph created based on observations of the applications and network devices connected to the network may be used to create a microsegmentation security policy.

During deployment of the systems and methods described herein, two main phases can be employed, observation as a first phase and enforcement as a second phase following the first phase. In some instances, the enforcement phases occur during a second phase, after the observation phase. In some scenarios these two phases can be done together. In the observation phase, the applications or workloads may be executed as normal, such as during a trial phase or initial setup phase. The observation phase may include observing executions based on network communications and/or telemetry and building the behavioral graph based on observed telemetry. After some predetermined period of time (e.g., seconds, minutes, days, weeks, etc.) and/or based on coverage on an amount of the code, workloads, applications, etc., (e.g., when the observed portion of the workloads or other way to measure the portion of network communications reaches a threshold such as 50%, 60%, 70%, 80%, 90%, etc.), then the observation phase may automatically be completed. In some examples, the observation phase may be monitored by a security team who may determine when to exit the observation phase and enter an enforcement phase.

The behavioral graph may be used to generate a network security policy that allows communications and/or executions as included within the behavioral graph, but does not allow outside of those observed interactions. Accordingly, the behavioral graph may be used to generate a network security policy that is then used in the enforcement phase to identify deviations from the observed behavioral graph and thereby identify potential threats and malicious actors or other potential exploits before they can be executed. The monitoring may be locally performed, performed using a cloud-based system using a enforcement agent at the local device, monitored on a network, or otherwise implemented.

The network security policy may be revised and edited according to the systems and methods described herein. In an example, a network security policy may have stale or dangling policies due to revisions, additions, removals, or other changes to the network security policy by a security team. For instance, a workload may be removed from the network (e.g., by removing an application or device) but rules and policies of the network security policy may not be removed as part of the removal of the workload. In some typical systems these dangling policies and rules may result in unintended consequences and/or gaps in the network security policy. The systems and methods described herein provide for removing dangling or stale policies that may have been left behind. In particular, the systems and methods herein provide for transforming an existing security policy into a behavioral graph. The behavioral graph may be easily examined for dangling or stale policies that may be removed before converting back to a network security policy from the behavioral graph, thereby removing the stale or dangling policies, in some examples, the systems and methods herein provide for converting existing policy into a behavioral graph and comparing the behavioral graph representation of the existing policy against a behavioral graph generated based on observations of communications within the network. The comparison may enable a security team to identify extraneous, dangling, duplicated, or otherwise unnecessary or problematic policies and adjust the network security policy accordingly.

The systems and methods herein may provide for evaluating the network security policy at or near real-time as the security team is making adjustments. For instance, the security team may wish to implement a particular new policy or rule based on a vulnerability recently discovered. The system may be used to evaluate the impacts of the new policy on the existing flows required by the various applications and hosts and ensure that the new policy won't prevent essential operations. In some examples, the systems and methods herein may be used to guide policy creation and adjustment, for example with guides and/or ratings for proposed changes to security policy based on collateral effects, effects on other systems or applications other than those that may be targeted by the security team with the new policy. Accordingly, the systems and methods herein provide a useful guide for ensuring that new implementations of network security policy can be rolled out quickly and effectively, without unintended consequences to essential operations in other portions of the network.

The techniques and systems described herein may be embodied in software, hardware, or hybrid environments that use both software and hardware for observing and monitoring application processes in a network system.

Given an observed behavioral graph for the network, the network security policy may be generated or refined, as discussed herein, such that malicious attacks and vulnerabilities (even unknown vulnerabilities) are not capable of being exploited at least because the systems and methods herein may, in some examples, block any communications, connections, or executions that fall outside of the bounds of the observed behavioral graph. In some examples, the behavioral graph may be observed over a period of time, but not all operations may be observed during the time period and may be validated or added to the behavioral graph outside of the observation window, such as being cleared by a security team or marked as safe based on one or more criteria.

Turning now to the figures, FIG. 1 illustrates an example system architecture 100 for behavioral monitoring using an observed behavioral graph, according to at least one example. The example system architecture 100 provides for secure operations of one or more components of a monitored system 102, for example by providing enhanced firewall and security monitoring as part of a network security policy for the monitored system 102. The example system architecture 100 uses behavioral graphs and workload execution monitoring in real-time allowing for the enforcement of the intended operations of the workloads and connections between network device(s) 106 of the monitored system 102.

The monitored system 102 may include a one or more computing devices, such as network device(s) 106 that may communicate over connections 104. The connections may include various network structures and communication connections that may include wired and wireless connections and provide for the network device(s) 106 to communicate with one another to execute processes 108. A security policy module 112 of the monitored system 102 receives telemetry 110 describing the processes 108 carried out and connections between the network device(s) 106 and other network device(s) 106 and/or other systems outside of the monitored system.

Using the telemetry 110, the security policy module 112, monitors execution of any process of interest and can evaluate whether to deny or allow processes 108 based at least in part on the network security policy. The security policy module 112 includes an observation agent 114, an enforcement agent 116, and an interface agent 118. The security policy module 112 implements a network security policy to ensure secure access to the systems, devices, and data of a particular network (such as the network device(s) 106 and the connections 104. The security policy module 112 may implement a rule-based security policy that may be managed by a security operations team. The security policy module 112 is responsible for applying and implementing the security policy in the monitored system 102 according to the constraints and operations of the specific security system.

Providing accessibility for creation of network security policy through the observation agent 114 and enforcement agent 116, understanding of complex network security policy, manipulation of the security policy, and querying the network security policy through the interface agent 118 to identify changes, redundancies, loopholes, as well as to explain purposes or reasons behind particular policies.

The observation agent 114 may be used to create a behavioral graph indicating behavior of the various components of the monitored system 102 including both internal and external connections. A behavioral graph, such as depicted in FIG. 2, may include a representation, using graph notation, of objects in a system and communications and/or interactions between the network device(s). In a behavioral graph, each node in the graph corresponds to an object such as a network device. A behavioral graph may be generated by, for example, observation during an observation phase (as described herein, by observing telemetry 110 and/or processes and communication between network devices on the network), security policy conversion into a behavioral graph, etc.

The behavioral graph may be created by the observation agent 114 for a plurality (e.g., all if possible) network devices on the network. As the behavioral graph is created for the various workloads across the network, the behavioral graph may become a representation of the communications required for the network device(s) 106 of the monitored system 102 to perform the actions required by the various applications. Accordingly, after the behavioral graph is created during an observation period, the network security policy may be created to restrict communications to only those included in the behavioral graph, thereby preventing malicious actions or threats from infiltrating the network.

The observation agent 114 may be used to perform an observation phase that is used to create an observed behavioral graph of the monitored system 102 during operation. After the observation phase, the enforcement agent 116 may be used to enforce the network security policy according to the behavioral graph during a monitoring phase. In some instances, the monitoring and/or enforcement phases occur during a second phase, after the observation phase. In some scenarios these two phases can be done together. In the observation phase, the observation agent 114 may observe executions of applications or workloads, such as during a trial phase or initial setup phase. The observation phase may include the observation agent 114 observing executions based on network communications and/or telemetry 110 and building the behavioral graph based on observed executions. In this manner, the behavioral graph is an observed behavioral graph built based on observed executions by the application or within the workload. After some predetermined period of time (e.g., seconds, minutes, days, weeks, etc.) and/or based on coverage on an amount of the code, workloads, applications, etc., (e.g., when the observed portion of the workloads or other way to measure the portion of network communications reaches a threshold such as 50%, 60%, 70%, 80%, 90%, etc.), then the observation phase may automatically be completed. In some examples, the observation phase may be monitored by a security team who may determine when to exit the observation phase and enter a monitoring phase.

Using the telemetry 110 of the processes 108, the enforcement agent 116 monitors execution of the processes 108. Given an observed behavioral graph, and associated network security policy discussed herein, the enforcement agent 116 is able to detect deviations from the observed behavior due to malicious attacks on the monitored system 102. The enforcement agent 116 can leverage the telemetry 110 to monitor executions using the security policy and an enforcement mechanism for the monitored system 102.

In some examples, the security policy module 112 may provide additional functionality, such as to enable a security operations center (SOC) to appropriately respond, including reporting of the exploit and/or directing the monitored system 102 and/or network device(s) 106 how to respond, whether to kill the process, redirect, shut down the monitored system 102 or network device(s) 106, or other such actions.

In some examples, the security policy module 112 may allow processes 108 to execute but to block communications from the application from executing. This could include both remote and local communications. In such a scenario, an application that has violated the guardrails of the network security policy representing the observed behavioral graph might be allowed to continue to run, but not be able to interact with any other application or system. Such guarded execution may be helpful to forensically analyze the intent of the attack, without actually enabling it to cause harm.

The behavioral graph may be used to generate a network security policy by the security policy module 112 that allows communications and/or executions as included within the behavioral graph, but does not allow outside of those observed interactions. Accordingly, the security policy module 112 may use the behavioral graph to generate a network security policy that is then used in the monitoring phase to identify deviations from the observed behavioral graph and thereby identify potential threats and malicious actors or other potential exploits before they can be executed. The monitoring may be locally performed, performed using a cloud-based system using an enforcement agent at the local device, monitored on a network, or otherwise implemented. Accordingly, the enforcement agent 116 may be located on or at any device capable of monitoring the communications of applications of the monitored system 102.

In an example, the security policy module 112 may generate the network security policy through a microsegmentation approach. Microsegmentation may refer to a security policy approach by dividing a network into segments and applying security controls to each segment based on the requirements of the segment. The microsegmentation security policy may only allow communications across the network that are required for applications run by the network devices, but nothing outside of those communications. The behavioral graph created based on observations of the applications and network devices connected to the network may be used to create a microsegmentation security policy.

The enforcement agent 116 uses the network security policy to enforce executions of processes 108 within the monitored system 102. The enforcement agent 116 uses any enforcement mechanism to implement the network security policy. The enforcement agent 116 may use the network security policy as revised or manipulated using the behavioral graph approach described herein.

The security policy module 112 may also provide functionality besides observation and enforcement of security policy based on an observed behavioral graph. For example, the security policy module 112 may provide for mapping and converting of network security policies into a behavioral graph that can manipulated, mapped, queried, and understood to simplify network security policy as well as ensure coverage and protection for a network.

The interface agent 118 of the security policy module 112 may be used to interface and/or interact with a network security policy to perform operations such as additions, revisions, editing, removals, etc. In particular, the interface agent 118 may provide for understanding of complex network security policy, manipulation of the security policy, and querying the network security policy through the interface agent 118 to identify changes, redundancies, loopholes, as well as to explain purposes or reasons behind particular policies.

In an example, a network security policy may have stale or dangling policies due to revisions, additions, removals, or other changes to the network security policy by a security team. For instance, a workload may be removed from the monitored system 102 (e.g., by removing an application or device) but rules and policies of the network security policy may not be entirely removed as part of the removal of the workload. In some typical systems these dangling policies and rules may result in unintended consequences and/or gaps in the network security policy. The security policy module 112 provides for removing dangling or stale policies through the interface agent 118. In particular, the interface agent 118 may be used to transform an existing network security policy into a behavioral graph using a deterministic approach that observes and/or identifies communications between nodes and may also include metadata associated with ports and/or other system components of the monitored system 102.

The interface agent 118 may also enable manipulation of network security policies through the use of manipulation of the behavioral graph using matrix operations, such as to add or remove portions of a behavioral graph. In particular, the interface agent 118 may first convert a network security policy into a behavioral graph. The behavioral graph may be manipulated by the interface agent, as directed by a security team directing a change to the network security policy. The interface agent 118 converts the network security policy into adjacency matrices that represent the behavioral graph and include square matrices that represent a finite graph (e.g., the behavioral graph). Once converted, the interface agent 118 may manipulate and perform operations on the adjacency matrices through operations such as matches, merges, subtractions, and other such operations in a uniform manner that may be automated rather than carried out by an individual on a security team, which is complex, time consuming, and difficult to perform accurately.

In an illustrative example, behavioral graphs representing a network security policy for a monitored system can be added to by combining into one single large behavioral graph through a combination of adjacency matrices of the original behavioral graph and the added behavioral graph representing an added policy.

The systems and methods described herein provide for conversion of network behavioral graphs to firewall policy. When done without any optimization, such transformation will create a new ALLOW rule for every triplet in the behavioral graph (e.g., (FROM_NODE)-[EDGE]-(TO_NODE)). For example, triplet such as (PROCESS_A)-[CONNECTED_ON_PORT_3306]-(MySQL) would create a new ALLOW rule for PROCESS_A running on particular host/container trying to connect on specific port 3306 to host/container where target MySQL server runs. Given this forward transformation, the behavioral graph to firewall policy, the system may also define how to perform reverse operation, given firewall policy convert it into a network behavioral graph which represents the current firewall policy. This allows the system to perform different queries and manipulations of firewall policy, which are not easy and/or possible without graph form.

The network behavioral graphs may include both behavioral graphs from observations and graphs from policy which may be equivalent. As a normal graph can be expressed as an adjacency list and adjacency matrix. In case of adjacency matrices expressed as sparse matrices for space efficiency while preserving all the advantages of matrix operation as applied to the behavioral graph.

The system also defines a number of operations on such behavioral graphs (both graphs from observations and graphs from policy) expressed as adjacency matrices/adjacency lists which allows to perform matches, merges, intersection, union, subtractions, and other graphs operations in uniform and high-performance ways. For example, graphs of multiple workloads (workload 1, workload 2, workload 3, workload 4) can be combined in one large graph, and policy generated for such graph as demonstrated below.

$$BG_{1234} = BG_1 + BG_2 + BG_3 + BG_4;$$
$$P_{1234} = GeneratePolicy(BG_{1234})$$

When later additional workloads (workload 1 and workload 2) are removed from the original graph it is possible to subtract just the removed workloads behavioral graphs, as illustrated below.

$$BG_{1234} = GraphGenerate(P_{1234});$$
$$P_{34} = PolicyGenerate(BG_{1234} - (BG_1 + BG_2))$$

When a workload or a portion of the workload is removed, the adjacency matrix representing that workload can be subtracted from the overall behavioral graph. In other operations, the behavioral graphs can be adjusted and various operations performed to add additional workloads, remove all or a portion of a workload, or otherwise alter the final behavioral graph.

The systems and methods herein may also provide for such actions when the firewall policy is a combination of automatically generated policy rules, old policy rules for which there is no corresponding behavioral graph, and rules created by the human given some other knowledge. When workload 1 and workload 2 are removed, the system may generate new policy by adding workload 3 and workload 4 but have to first convert the current firewall policy to graph and only then extract $BG_1+BG_2$. The operations are represented below.

$$P_{gen} =$$
$$GeneratePolicy(BG_1 + BG_2 + BG_3 + BG_4) - \text{policy generated from } BGs;$$
$$P_{old} - \text{existing policy for old workloads without corresponding } BGs;$$
$$P_{user} - \text{user created policy rules};$$
$$P_{total} = P_{gen} + P_{old} + P_{user}$$

To subtract $BG_1$ and $BG_2$ which correspond to workload 1 and workload 2, the system would perform following steps.

$$BG_{total} = GraphGenerate(P_{total})$$
$$P_{new} = PolicyGenerate(BG_{total} - (BG_1 + BG_2))$$

The illustrative example provided herein works not only when there is full control of firewall policy but also when there is only partially control of the firewall policy, by expressing policy in a behavioral graph it is able to remove behavioral graphs for removed workloads while keeping all other policy elements in the final policy.

The system also enables performing different queries over existing policy expressed as a graph. For example, user can ask constraint types of query such as "Is there NO direct path from internet to certain Kubernetes Pod in current firewall policy?"; "Is there any direct or indirect path to financial server storing earnings reports and other highly confidential financial information?"; or "Does any server that has a certain CVE have any direct or indirect way to connect to internet?". These queries may be expressed in one of graph query languages, such as Gremlin or openCypher.

When the security team wishes to add a workload or a portion of the workload is removed from the monitored system 102, the interface agent 118 may add or subtract an adjacency matrix representing the removed workload from the overall behavioral graph. The interface agent 118 may then convert the remaining behavioral graph into a network security policy, of any desired format.

The interface agent 118 may further evaluate a network security policy at or near real-time as the security team adjusts one or more rules. For instance, the security team may wish to implement a particular new policy or rule based on a vulnerability recently discovered. The interface agent 118 may evaluate the impacts of the new policy on the existing flows required by the various applications and hosts and ensure that the new policy won't prevent essential operations. To evaluate the impact, the interface agent 118 may convert the new policy into a behavioral graph and then perform a matrix operation to add the behavioral graph of the new policy to the existing policy. The interface agent 118 may identify one or more changes that occur to the original behavioral graph and may report those impacts or changes to the security team. Accordingly, the interface agent 118 may be used to guide policy creation and adjustment, for example with guides to the impacts of particular changes and/or ratings for proposed changes determined by the interface agent 118 based on collateral effects, effects on other systems or applications other than those that may be targeted by the security team with the new policy.

FIG. 2 illustrates an example of a behavioral graph 200 used for monitoring application executions, according to at least one example. The behavioral graph 200 is a representation, using graph notation, of network communications a monitored system 102 during execution of one or more applications. The behavioral graph 200 may represent a firewall or network security policy of the monitored system 102 of FIG. 1.

Figure 3:
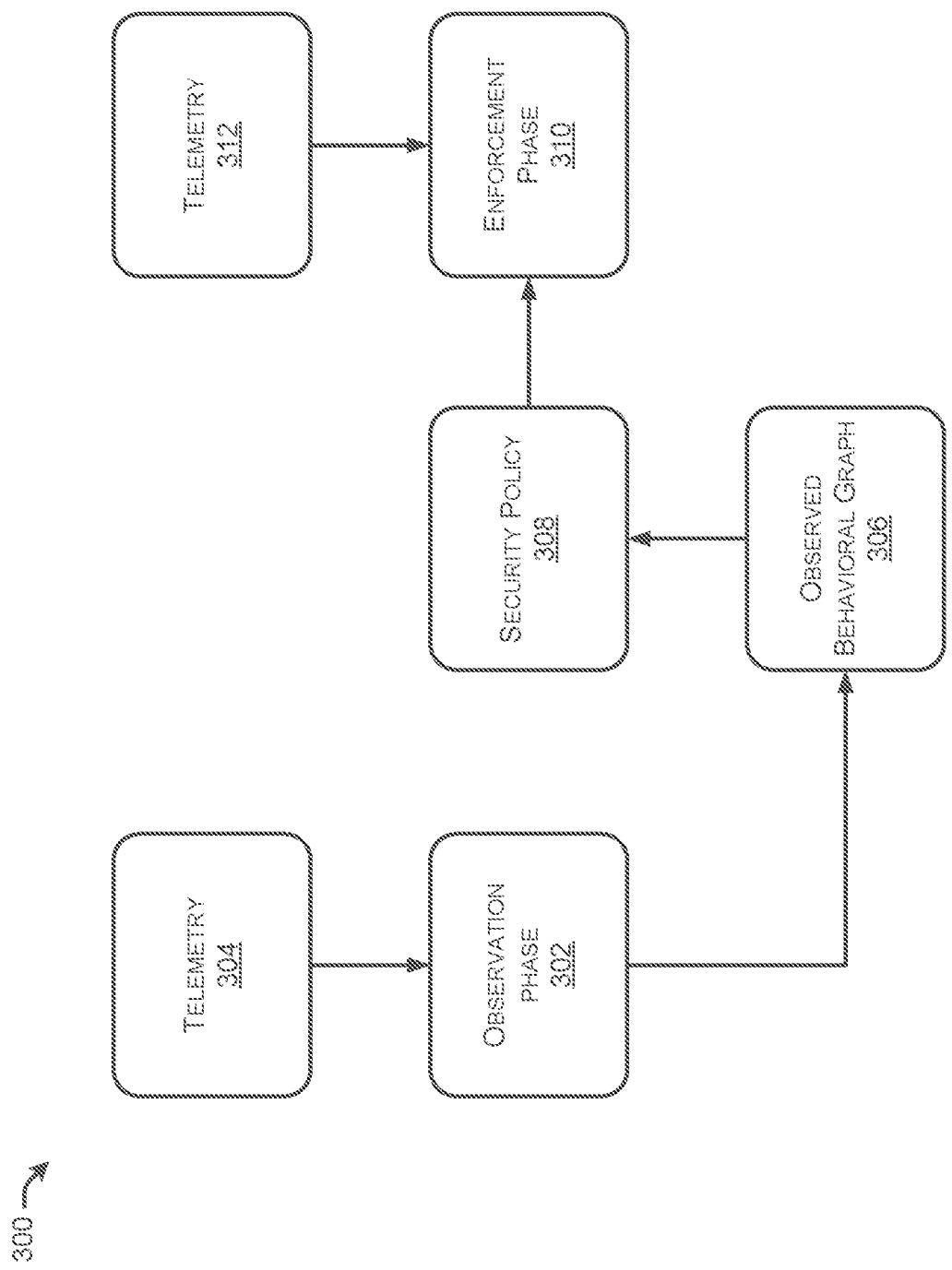
FIG. 3 illustrates an example of a process for generating a network security policy based on observed network application executions, according to at least one example.

FIG. 3 illustrates an example of a process 300 for generating a network security policy based on observed network application executions, according to at least one example. The process 300, as illustrated, includes a representation of the observation phase 302. The observation phase 302 may be a phase that a monitored system 102, such as described herein, is in during observation of processes 108. The observation phase 302 is based on received telemetry 304, as discussed herein. During the observation phase 302, the security policy module 112 determines an observed behavioral graph 306, as discussed herein. The observed behavioral graph 306 is then used by the security policy module 112 when in the enforcement phase 310 to enforce the observed behavioral graph 306 as part of a security policy 308 when compared against real-time or near real-time telemetry 312.

The security policy 308 may include a pre-existing security policy and/or a security policy determined based at least in part on the observed behavioral graph determined during the observation phase 302. The security policy 308 may be used by the security policy module 112 to allow or prevent processes and/or communications within the monitored system 102. The security policy 308 may be converted from the observed behavioral graph 306 through a conversion based on observed connections and/or communications between nodes (e.g., network devices) on the network.

Figure 4:
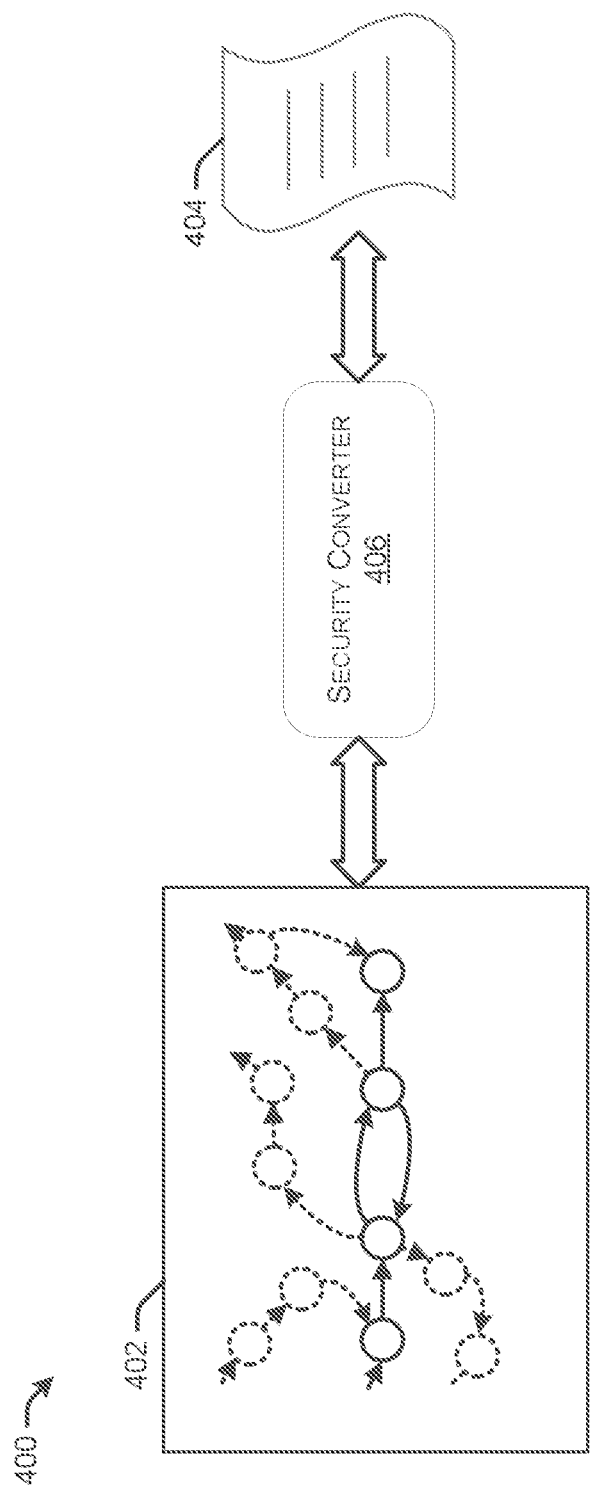
FIG. 4 illustrates an example of a system for converting between a network security policy and a behavioral graph, according to at least one example.

FIG. 4 illustrates an example of a system 400 for converting between a network security policy and a behavioral graph depicting the network security policy, according to at least one example. The system 400 provides for converting, using a security converter 406, between a network security policy 404 and a behavioral graph 402, as discussed herein. The conversion from the network security policy 404 to the behavioral graph 402 enables manipulations of firewall policy as a behavioral graph providing functionality such as an ability to query practical questions about the firewall policy. The behavioral graph 402 may be created, by the security converter 406 based on the network security policy 404 and/or may be generated by observation of network application executions during an observation period.

The security converter 406 may include one or more computer-implemented systems and may provide the ability to convert back and forth between the behavioral graph 402 and the network security policy 404 that may be used an understood by an existing security system for a monitored system. The security converter 406 may generate the behavioral graph 402 based on the network security policy 404 and vice versa through an analysis of the network devices and communications, as included in the behavioral graph.

In some examples, the security converter 406 may be used by the interface agent 118 to convert back and forth between network security policy 404 (in any suitable format) and a behavioral graph 402.

The conversion by the security converter 406 may enable manipulation of network security policies through the use of manipulation of the behavioral graph using matrix operations, such as to add or remove portions of a behavioral graph. In particular, the security converter 406 may first convert a network security policy 404 into a behavioral graph 402. The behavioral graph 402 may be manipulated by the interface agent 118 as discussed herein. In some examples, the behavioral graph 402 may be stored as one or more adjacency matrices that represent the behavioral graph 402 and include square matrices that represent a finite graph (e.g., the behavioral graph). Once converted, the interface agent 118 may manipulate and perform operations on the adjacency matrices through operations such as matches, merges, subtractions, and other such operations in a uniform manner that may be automated rather than carried out by an individual on a security team, which is complex, time consuming, and difficult to perform accurately.

The security converter 406 also enables the interface agent 118 to provide additional functionality such as an interface for a user to query the network security policy using a graph query language to identify potential vulnerabilities or identify potential weaknesses. For example a user may query the network security policy 404 and interact with the behavioral graph 402 to determine a response or answer based on the query and may also cause one or more changes to the behavioral graph 402 that may be propagated to the network security policy 404 when the altered behavioral graph is converted by the security converter 406.

Figure 5:
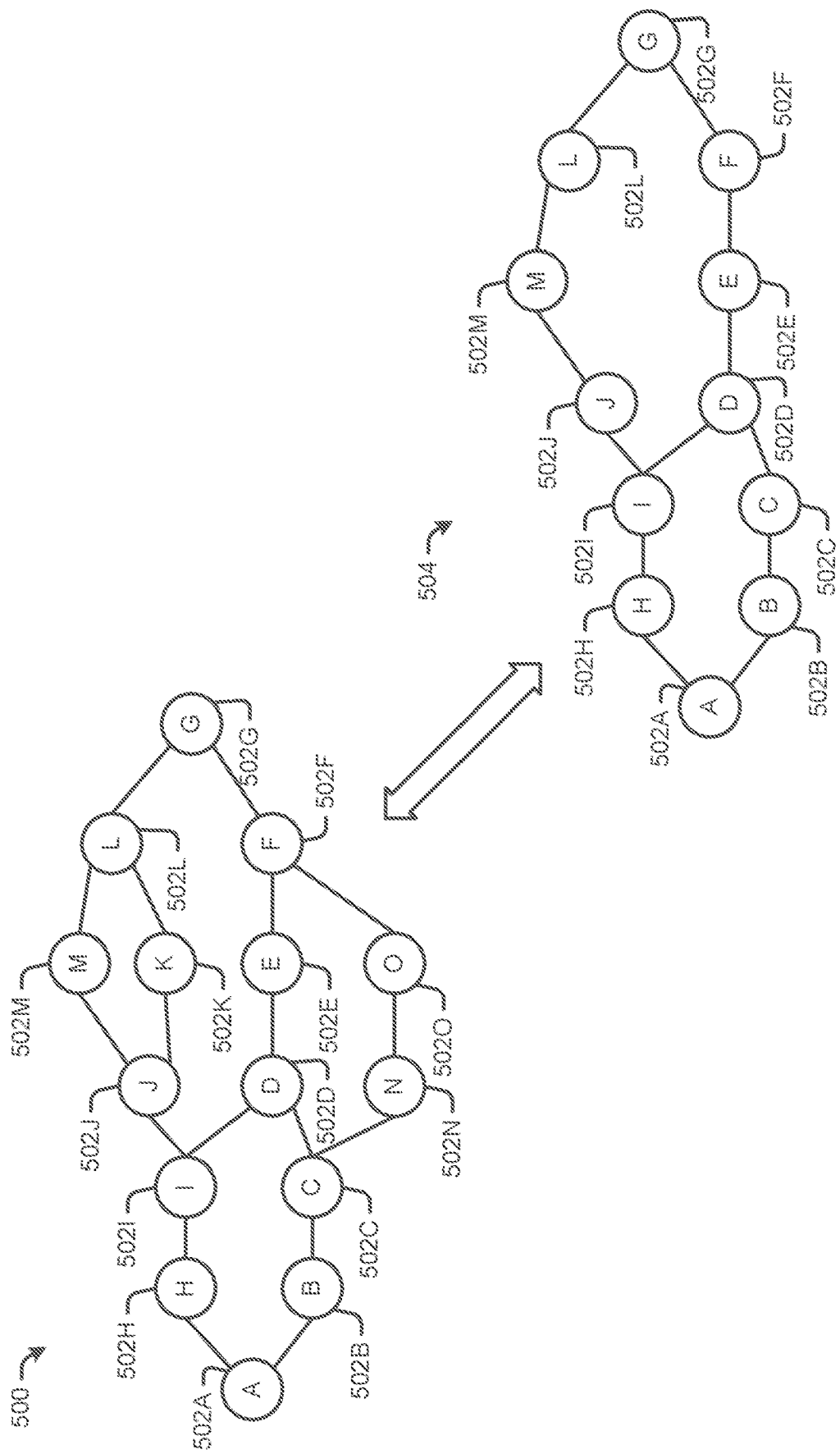
FIG. 5 illustrates an example of comparing an existing network security policy modeled using a first behavioral graph with an observed behavioral graph, according to at least one example.

FIG. 5 illustrates an example of comparing an existing network security policy modeled using a first behavioral graph with an observed behavioral graph, according to at least one example.

The first behavioral graph 500 is a representation, using graph notation, of a network security policy that has been converted into a behavioral graph notation, such as by the security converter 406 of FIG. 4. The first behavioral graph 500 shows nodes 502A, 502B, 502C, 502D, 502E, 502F, 502G, 502H, 502I, 502J, 502K, 502L, 502M, 502N, and 502O (collectively nodes 502A-502O) in the graph that correspond to network devices that communicate and/or otherwise are connected over a network.

The first behavioral graph 500 may be built by a security converter 406 using an existing network security policy to show allowed or allowable executions within a monitored system. The first behavioral graph may include edges that may correspond to network connections that are no longer implemented within the monitored system. Accordingly, in at least one example, a security system may generate a second behavioral graph 504 based on observed processes and workflows to simplify, clean up, and otherwise streamline the network security policy.

The second behavioral graph 504 may be an example of the behavioral graph that is observed and use for enforcement as described herein. The security system of the monitored system, such as the security policy module 112, may generate the second behavioral graph 504 and subsequently compare the first behavioral graph 500 (showing the existing network security policy) with the second behavioral graph 504. The comparison may reveal that the flows within the first behavioral graph 500 from node 502C to node 502N to node 502O and then to node 502F is obsolete or unnecessary, and may be an example of a dangling or stale policy from a precursor security policy. Additionally, the flow from node 502J to node 502K to node 502L may also not be observed by the security policy module 112 during the observation phase.

Accordingly, the security policy module 112 may alter the first behavioral graph 500 based on the second behavioral graph 504 such that the unobserved edges are removed, Subsequently, when the modified version of the first behavioral graph 500 is converted into a network security policy by the security converter 406, the network security policy may represent the observed transitions without the unintended, unnecessary, or stale policies remaining that may result in unintended consequences, including potentially vulnerabilities in the security of the monitored system.

In some examples, the security policy module 112 may not alter the first behavioral graph 500, but may present recommendations to the SOC to change the first behavioral graph 500 and/or corresponding network security policy based on the second behavioral graph 504. The suggestions may be implemented by the SOC to ensure control and understanding over the network security policy by the SOC.

Figure 6:
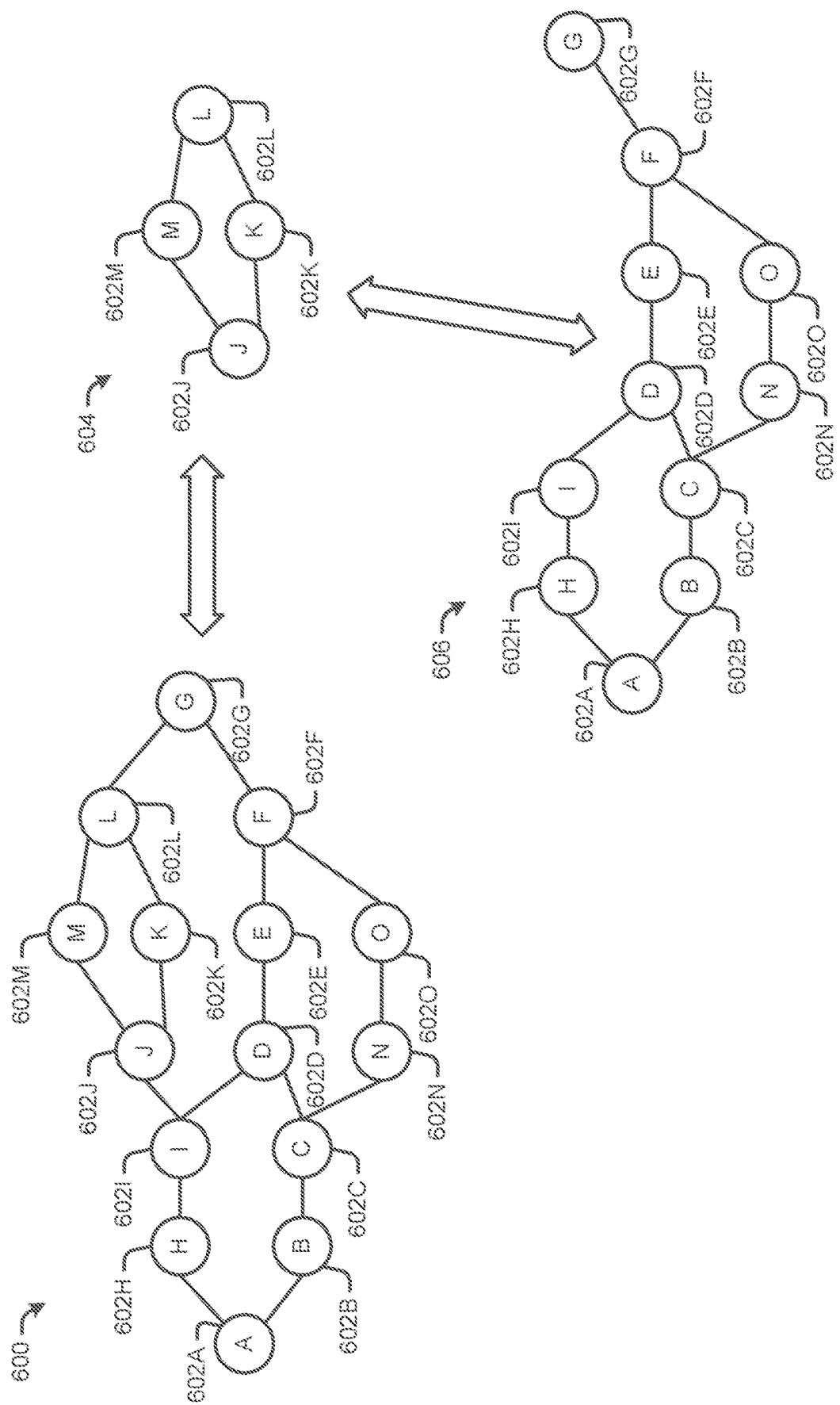
FIG. 6 illustrates an example of manipulation of network security policies based on behavioral graph changes, according to at least one example.

FIG. 6 illustrates an example of manipulation of network security policies based on behavioral graph changes, according to at least one example. The example provided herein is illustrative of the manipulation discussed herein using adjacency matrices or other matrix operations for manipulation of the behavioral graph to add and/or remove portions of the behavioral graph. Additionally, in some examples, the behavioral graph may be altered, for instance by changing connections with and/or without removing or adding nodes to the behavioral graph.

As discussed herein, the behavioral graphs representing the observed executions and/or representing the network security policy may be manipulated using matrix operation. In particular, the security policy may be manipulated by converting first into a behavioral graph and then performing operations on the behavioral graphs expressed as adjacency matrices. The adjacency matrices represent the behavioral graph and include square matrices that represent a finite graph (e.g., the behavioral graph). Accordingly, operations may be performed using the adjacency matrices including matches, merges, subtractions, and other such operations in a uniform manner that may be automated rather than carried out by an individual on a security team. For example, graphs of multiple workloads can be combined in one large graph, with the network security policy generated for such graphs. When two workloads are removed from the original graph it is possible to subtract the removed workloads using matrix operations.

When a workload or a portion of the workload is removed, the adjacency matrix representing that workload can be subtracted from the overall behavioral graph. In other operations, the behavioral graphs can be adjusted and various operations performed to add additional workloads, remove all or a portion of a workload, or otherwise alter the final behavioral graph.

In an illustrative example, as depicted in FIG. 6, the first behavioral graph 600 may include nodes 602A, 602B, 602C, 602D, 602E, 602F, 602G, 602H, 602I, 602J, 602K, 602L, 602M, 602N, and 602O (collectively nodes 602A-602O) and may represent a first network security policy. A second behavioral graph 604 with nodes 6023-602M may represent a second network security policy that may be a portion or building block of the first behavioral graph 600 and associated network security policy. A third behavioral graph 606 includes nodes 602A-602I and 602N-602O. Accordingly, an operation to build the first behavioral graph may include matrix addition of the adjacency matrices representing the second behavioral graph 604 and the third behavioral graph 606. Similarly, the third behavioral graph 606 may be produced by removing or subtracting the second behavioral graph 604 from the first behavioral graph, again as represented in matrix operations discussed herein.

Figure 7:
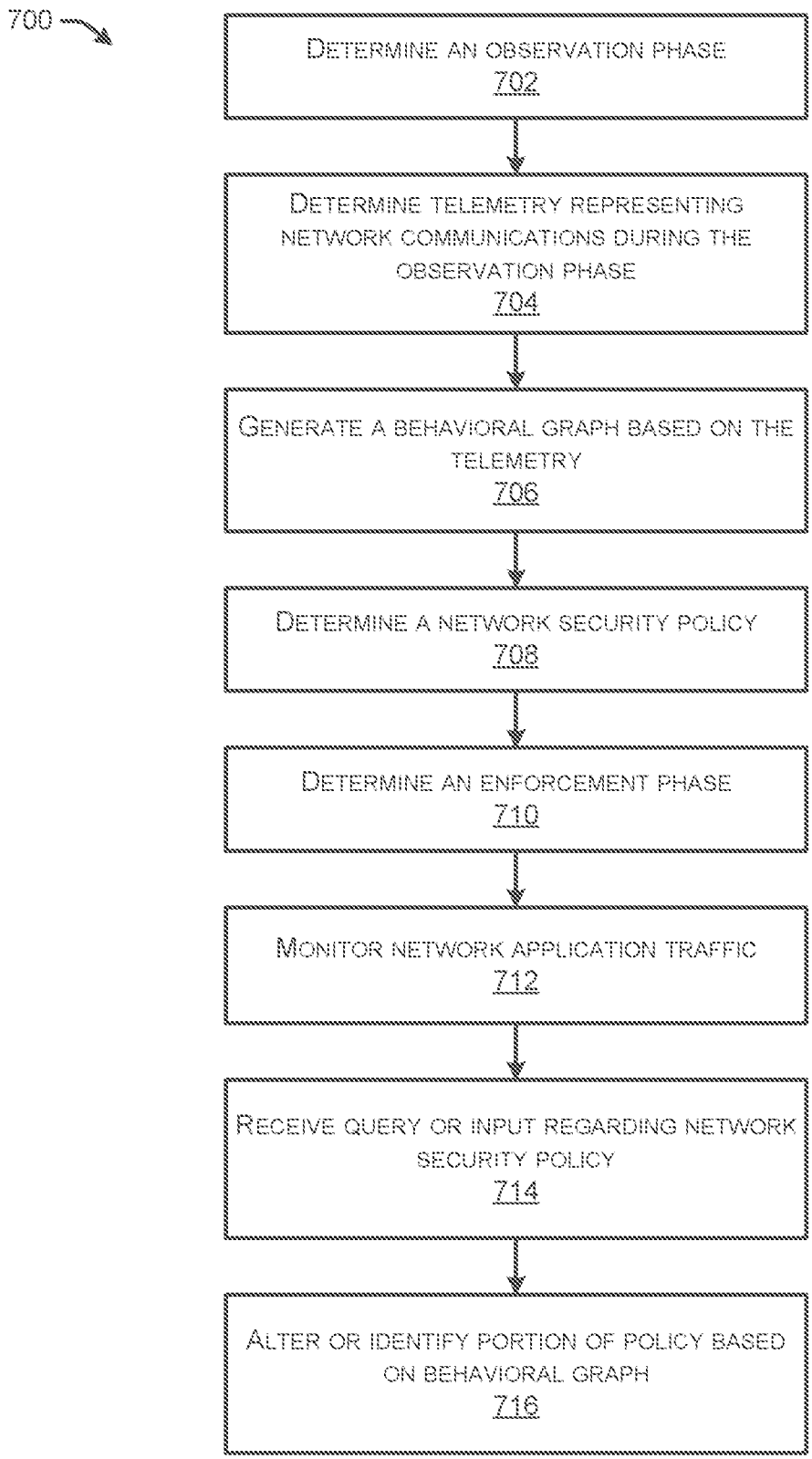
FIG. 7 illustrates an example process for observing network system executions and enforcing a network security policy based thereon, according to at least one example.

FIG. 7 illustrates a process 700 for observing network communications and enforcing a network security policy based thereon, according to at least one example. The processes described herein are illustrated as collections of blocks in logical flow diagrams, which represent a sequence of operations, some, or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIG. 7 illustrates a process 700 for observing network communications and enforcing a network security policy based thereon, according to at least one example. At operation 702, the process 700 may include a computing device determining an observation phase for observing execution of processes on the monitored system. Determining the observation phase may include determining a predetermined observation time window to observe communications by an application or a predetermined process, application, or workload percentage to observe. In some examples, the observation time window may be a set number of minutes, days, second, etc. In some examples, the observation phase may include a period of time until a threshold amount of the processes, applications, or workloads are observed executing. The threshold amount may include a percentage and may be configurable by a security operations center.

At operation 704, the process 700 may include a computing device collecting and/or determining telemetry, during the observation phase, representing communications of the processes. The telemetry may include telemetry representing execution of processes and applications within the monitored system.

At operation 706, the process 700 may include a computing device generating a behavioral graph based on the telemetry. In some examples, the behavioral graph may be generated by normalizing the observed network communications into a graph representation that may be understood by a variety of different devices and systems. Generating the behavioral graph may be based on observed communications during the observation phase, where the observed transfers during the observation phase are considered valid transfers.

At operation 708, the process 700 may include a computing device determining a network security policy. The network security policy may be determined based on the behavioral graph, for example, by converting the behavioral graph from the observation phase into a network security policy of a format that may be understood and implemented by a security system of the monitored system. The network security policy may be generated based on a deterministic processing of an input of at least the observed behavioral. In some examples, the network security policy may be determined based on a comparison of a first or pre-existing network security policy (converted into a behavioral graph) with the behavioral graph, to determine one or more changes or recommended changes to the network security policy based on the observed behavioral graph.

At operation 710, the process 700 may include a computing device determining a enforcement phase based at least in part on the behavioral graph, network security policy, and/or an input from an SOC. Determining the enforcement phase may include determining completion of the observation phase based at least in part on the behavioral graph representing at least a threshold of application processes. In some examples, the enforcement phase may begin based on expiration of a time period for the observation phase and/or an instruction from a security center to begin the monitoring phase. In some examples, the network security policy of operation 708 may not be generated until the observation phase is completed.

At operation 712, the process 700 may include a computing device monitoring network application traffic. The network application traffic may include processes, applications, communications, and telemetry from one or more network devices within the monitored system. The monitoring phase may be performed using a hardware device of the monitored system or of a separate system and also may be implemented in one or more cloud-based or virtual computing environments, as well as remote computing systems.

At operation 714, the process 700 may include receiving a query or input regarding the network security policy. The input may be received at a user interface associated with a security operations center and may include a query regarding the existing policy and/or one or more possible changes to the security policy.

At operation 716, the process 700 may additionally include altering or identifying a portion of a network security policy based on the behavioral graph. The alteration may include a removal of a stale or dangling policy or may include additions or subtractions of policies based on the observed behavioral graph, as discussed herein.

Figure 8:
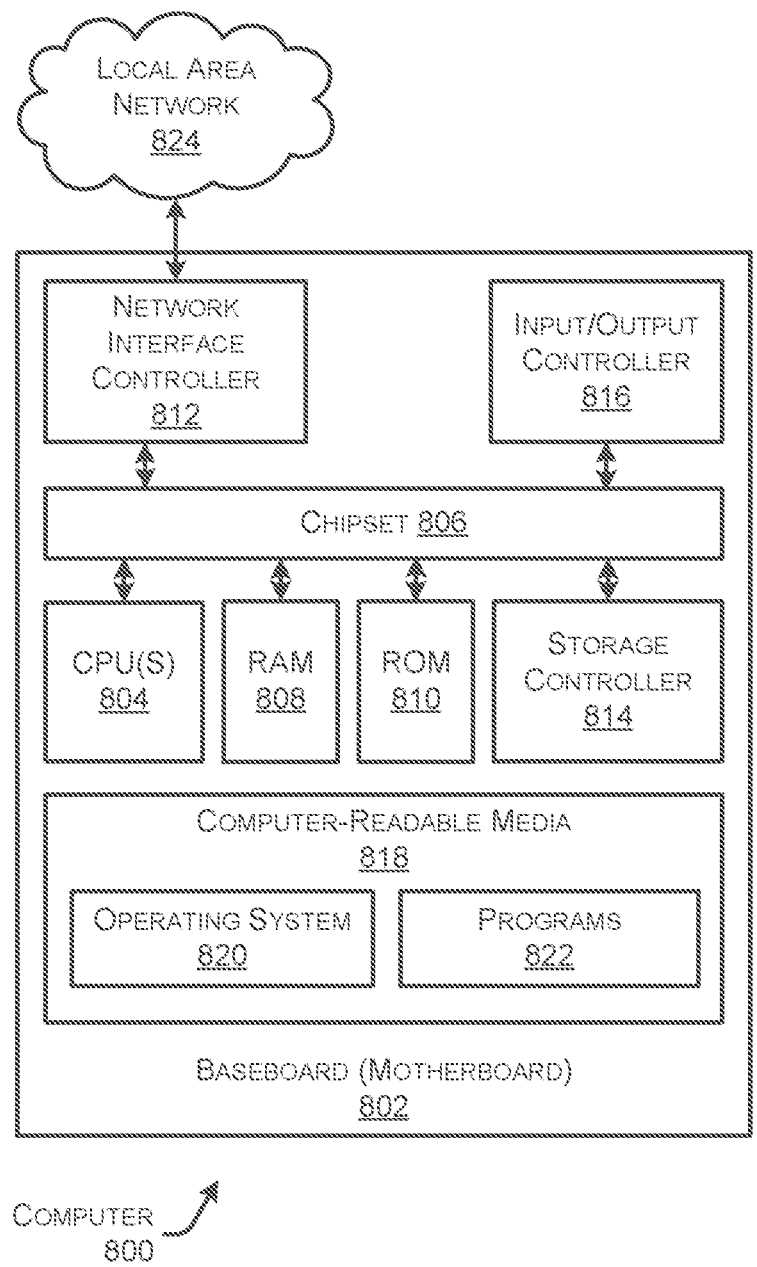
FIG. 8 is a computer architecture diagram showing an illustrative computer hardware architecture for implementing a computing device that can be utilized to implement aspects of the various technologies presented herein.

FIG. 8 is an architecture diagram for a computer 800 showing an illustrative computer hardware architecture for implementing a computing device that can be utilized to implement various aspects of the various technologies presented herein. The computer architecture shown in FIG. 8 illustrates a conventional server computer, workstation, desktop computer, laptop, tablet, network appliance, e-reader, smartphone, or other computing device, and can be utilized to execute any of the software components presented herein. In some examples, the computer 800 may be part of a system of computers, such as the local area network 824 or other such devices described herein. In some instances, the computer 800 may be included in a system of devices that perform the operations described herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs 804") operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage media 818 such as a read-only memory ("ROM 810") or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the local area network 824 or other networks, including for example the internet. The chipset 806 can include functionality for providing network connectivity through a network interface controller ("NIC 812"), such as a gigabit Ethernet adapter. The NIC 812 is capable of connecting the computer 800 to other computing devices over the local area network 824. It should be appreciated that multiple NICs can be present in the computer 800, connecting the computer to other types of networks and remote computer systems.

The computer 800 can include storage 814 (e.g., disk) that provides non-volatile storage for the computer. The storage 814 can consist of one or more physical storage units. The storage 814 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage 814 by detecting the physical states or characteristics of one or more particular locations within the physical storage units.

In addition to the storage 814 described above, the computer 800 can have access to other computer-readable storage media to store and retrieve information, such as programs 822, operating system 820, data structures, or other data. It should be appreciated by those skilled in the art that computer-readable storage media 818 is any available media that provides for the non-transitory storage of data and that can be accessed by the computer 800. Some or all of the operations performed by any components included therein, may be performed by one or more computer(s) operating in a network-based arrangement.

By way of example, and not limitation, computer-readable storage media 818 can include volatile and non-volatile, removable, and non-removable media implemented in any method or technology. Computer-readable storage media 818 includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The computer-readable storage media 818 can store an operating system 820 utilized to control the operation of the computer 800. According to one embodiment, the operating system comprises the LINUX operating system. According to another embodiment, the operating system comprises the WINDOWS SERVER operating system from MICROSOFT Corporation of Redmond, Washington. According to further embodiments, the operating system can comprise the UNIX operating system or one of its variants. It should be appreciated that other operating systems can also be utilized. The computer-readable storage media 818 can store other system or programs 822 and data utilized by the computer 800.

In one embodiment, the computer-readable storage media 818, storage 814, RAM 808, ROM 810, and/or other computer-readable storage media may be encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various techniques described above. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for monitoring a network system of computing devices, comprising:
   determining an observation phase for observing the network system during which valid transfers or valid processes associated with network applications in the network system are observed;
   determining observed telemetry, during the observation phase, representing executions of the valid transfers or the valid processes;
   generating a behavioral graph representing execution sequences of network applications based on the observed telemetry, wherein the behavioral graph represents the valid transfers or valid processes that were observed in the observation phase;
   determining a network security policy by determining one or more rules for computing devices of the network system based at least in part on the behavioral graph, wherein the network security policy allows performance of the valid transfers or the valid processes and disallows unobserved transfers or unobserved processes that were unobserved in the observation phase;
   determining a monitoring phase based at least in part on the behavioral graph; and
   monitoring network application traffic to prevent or allow executions based at least in part on the network security policy.

2. The method of claim 1, wherein determining the network security policy comprises converting the behavioral graph to a security policy through a deterministic analysis of nodes in the behavioral graph.

3. The method of claim 1, further comprising;
   receiving an input describing one or more changes to the network security policy;
   determining a flow graph based at least in part on the input;
   determining a second behavioral graph by altering the behavioral graph using the flow graph; and
   determining a second network security policy using the second behavioral graph, wherein monitoring the network application traffic is further based at least in part on the second network security policy.

4. The method of claim 3, wherein determining the flow graph based at least in part on the input comprises:
receiving a plain language description of the one or more changes;
determining, using a machine learning technique, a recommendation for determining the second behavioral graph; and
receiving an input in response to the recommendation, wherein determining the second behavioral graph is in response to the input.

5. The method of claim 1, further comprising:
receiving a change to the network security policy;
determining second observed telemetry in response to the change to the network security policy;
determining a second behavioral graph based at least in part on the second observed telemetry;
determining one or more differences by comparing the behavioral graph and the second behavioral graph; and
generating a notification indicating the one or more differences.

6. The method of claim 5, further comprising:
determining a first behavioral graph describing a previous network security policy;
determining one or more differences between the behavioral graph and the first behavioral graph; and
generating a second behavioral graph by removing portions of the first behavioral graph based at least in part on the one or more differences.

7. A system comprising:
one or more processors; and
one or more non-transitory computer-readable media storing computer-executable instructions that, when executed by the one or more processors, cause the one or more processors to perform operations comprising:
determining an observation phase for observing a network system during which valid transfers or valid processes associated with network applications in the network system are observed;
determining observed telemetry, during the observation phase, representing executions of the valid transfers or the valid processes;
generating a behavioral graph representing execution sequences of network applications based on the observed telemetry, wherein the behavioral graph represents the valid transfers or valid processes that were observed in the observation phase;
determining a network security policy by determining one or more rules for computing devices of the network system based at least in part on the behavioral graph, wherein the network security policy allows performance of the valid transfers or the valid processes and disallows unobserved transfers or unobserved processes that were unobserved in the observation phase;
determining a monitoring phase based at least in part on the behavioral graph; and
monitoring network application traffic to prevent or allow executions based at least in part on the network security policy.

8. The system of claim 7, wherein determining the network security policy comprises converting the behavioral graph to a security policy through a deterministic analysis of nodes in the behavioral graph.

9. The system of claim 7, further comprising:
receiving an input describing one or more changes to the network security policy;
determining a flow graph based at least in part on the input;
determining a second behavioral graph by altering the behavioral graph using the flow graph; and
determining a second network security policy using the second behavioral graph, wherein monitoring the network application traffic is further based at least in part on the second network security policy.

10. The system of claim 9, wherein determining the flow graph based at least in part on the input comprises:
receiving a plain language description of the one or more changes;
determining, using a machine learning technique, a recommendation for determining the second behavioral graph; and
receiving an input in response to the recommendation, wherein determining the second behavioral graph is in response to the input.

11. The system of claim 7, further comprising:
receiving a change to the network security policy;
determining second observed telemetry in response to the change to the network security policy;
determining a second behavioral graph based at least in part on the second observed telemetry;
determining one or more differences by comparing the behavioral graph and the second behavioral graph; and
generating a notification indicating the one or more differences.

12. The system of claim 11, further comprising:
determining a first behavioral graph describing a previous network security policy;
determining one or more differences between the behavioral graph and the first behavioral graph; and
generating a second behavioral graph by removing portions of the first behavioral graph based at least in part on the one or more differences.

13. One or more non-transitory computer-readable media storing computer-readable instructions that, when executed by one or more processors, cause the one or more processors to perform operations comprising:
determining an observation phase for observing a network system during which valid transfers or valid processes associated with network applications in the network system are observed;
determining observed telemetry, during the observation phase, representing executions of the valid transfers or the valid processes;
generating a behavioral graph representing execution sequences of network applications based on the observed telemetry, wherein the behavioral graph represents the valid transfers or valid processes that were observed in the observation phase;
determining a network security policy by determining one or more rules for computing devices of the network system based at least in part on the behavioral graph, wherein the network security policy allows performance of the valid transfers or the valid processes and disallows unobserved transfers or unobserved processes that were unobserved in the observation phase;
determining a monitoring phase based at least in part on the behavioral graph; and
monitoring network application traffic to prevent or allow executions based at least in part on the network security policy.

14. The one or more non-transitory computer-readable media of claim 13, further comprising:
receiving a change to the network security policy;

determining second observed telemetry in response to the change to the network security policy;

determining a second behavioral graph based at least in part on the second observed telemetry;

determining one or more differences by comparing the behavioral graph and the second behavioral graph; and generating a notification indicating the one or more differences.

15. The one or more non-transitory computer-readable media of claim 14, further comprising:

determining a first behavioral graph describing a previous network security policy;

determining one or more differences between the behavioral graph and the first behavioral graph; and generating a second behavioral graph by removing portions of the first behavioral graph based at least in part on the one or more differences.

16. The one or more non-transitory computer-readable media of claim 13, further comprising;

receiving an input describing one or more changes to the network security policy;

determining a flow graph based at least in part on the input;

determining a second behavioral graph by altering the behavioral graph using the flow graph; and determining a second network security policy using the second behavioral graph, wherein monitoring the network application traffic is further based at least in part on the second network security policy.

17. The one or more non-transitory computer-readable media of claim 16, wherein determining the flow graph based at least in part on the input comprises:

receiving a plain language description of the one or more changes;

determining, using a machine learning technique, a recommendation for determining the second behavioral graph; and receiving an input in response to the recommendation, wherein determining the second behavioral graph is in response to the input.

18. The one or more non-transitory computer-readable media of claim 13, wherein determining the network security policy comprises converting the behavioral graph to a security policy through a deterministic analysis of nodes in the behavioral graph.

* * * * *